Aug. 17, 1926.

K. F. NAGELE 1,596,210

SEARCHLIGHT PROJECTOR FOR CLOSED VEHICLES

Filed April 6, 1925

Witnesses

Inventor
Karl Friedrich Nägele

Patented Aug. 17, 1926.

1,596,210

UNITED STATES PATENT OFFICE.

KARL FRIEDRICH NAGELE, OF BERLIN-NEUKOLLN, GERMANY, ASSIGNOR TO AERO, MOTOR- UND AUTO ZUBEHÖR A.-G., OF BERLIN, GERMANY.

SEARCHLIGHT PROJECTOR FOR CLOSED VEHICLES.

Application filed April 6, 1925, Serial No. 21,237, and in Germany August 8, 1924.

Figure 1:
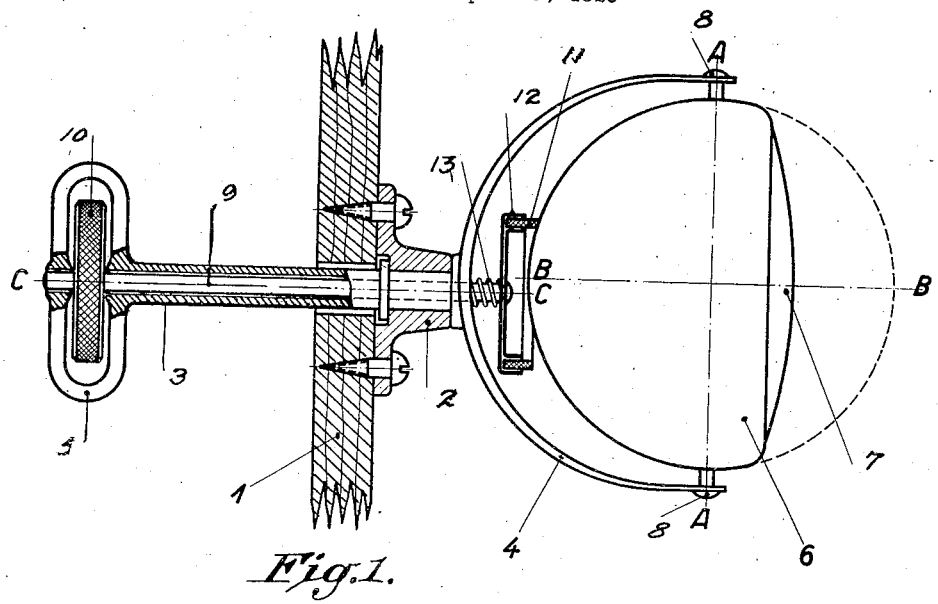
Figure 2:
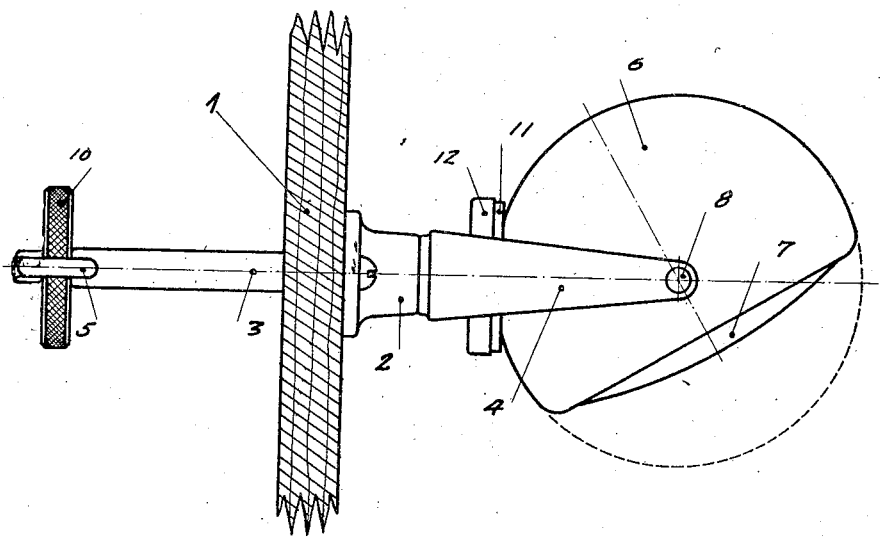

The invention relates to a search light projector for closed vehicles. In the accompanying drawing Figure 1 is a side view partially in section and Figure 2 is a plan view in which, however, the lamp member is in a different position from that shown in Figure 1.

On the vehicle wall 1 a flange 2 is fastened, which carries a tube 3 which can be turned in the flange 2 with a slight amount of friction. Outside the vehicle a fork 4 is connected to this tube, between the arms of which fork the lamp member 6 is carried by the two pins so as to be capable of turning about the axis A—A. Inside the vehicle the tube is provided with a ring 5 which serves as an operating handle. By turning this ring the tube 3 and with it the fork 4 together with the lamp supported therein can be turned in known manner about the horizontal axis c, c.

Within the tube 3 a shaft 9 is carried, which can be rotated by a handwheel 10 situated inside the vehicle, and which carries outside the vehicle a disc 12 faced with a rubber ring 11, which presses lightly against the lamp casing 6 under the action of a spring 13. This lamp casing is of spherical form up to the glass 7, but the centre line B—B of the casing is not in line with the centre line C—C of the tube 3 but lies a few millimetres higher. Owing to this extra-axial arrangement of the two axes B—B and C—C, only part of the circumference of the rubber ring 11 rests on the spherical lamp casing 6. If therefore the handwheel 10 is turned the lamp casing is swung about the axis A—A as may be seen from Figure 2. It can be seen that this swinging is effected without any use of gear wheels, worms wheels, levers or the like. Further, since the lamp casing is borne and supported sufficiently near its centre of gravity (the small distance between the two axes B—B and C—C can practically be neglected) it will remain in the position in which it is placed without any special locking device, for there is a certain locking effect obtained from the friction of the tube 3 in the flange 2 and further by the partial contact of the rubber ring 11 on the lamp casing 6.

In a further modification of the invention a spherical glass (as indicated by dotted lines in the drawing) is provided for the lamp casing instead of the usual plain glass 7, which practically turns the lamp casing 6 into a complete sphere. In this it is possible to swing the lamp casing through an angle of 360°, whilst the constructions hitherto known allow only about half so extended a range.

What I claim is:—

1. In a search light projector for vehicles rotatably carried in fork mounting, a projector casing of spherical contour, a friction ring bearing directly on said projector casing carried in eccentric relation to said casing so that it only contacts with said casing with a portion of its periphery, and means for rotating said friction ring.

2. A search light projector for vehicles operable from within the vehicle, comprising a tubular mounting extending through the wall of the vehicle, a fork carried on the outer end of said mounting, a projector having a spherical contour rotatably carried in said fork with its axis of rotation at an angle to said tubular mounting and with its centre axially displaced from the axis of said tubular mounting, a spindle carried within said tubular mounting, a friction disc on the outer end of said spindle, spring means on said spindle arranged to press said friction disc into contact with the outer surface of said projector, and operating handles on the inner ends of said tubular mounting and said spindle.

In testimony whereof I have signed my name to this specification.

KARL FRIEDRICH NAGELE.